United States Patent
Sugime

(10) Patent No.: US 11,888,534 B2
(45) Date of Patent: Jan. 30, 2024

(54) POWER SOURCING EQUIPMENT OF POWER-OVER-FIBER SYSTEM AND POWER-OVER-FIBER SYSTEM

(71) Applicant: KYOCERA CORPORATION, Kyoto (JP)

(72) Inventor: Tomonori Sugime, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/905,939

(22) PCT Filed: Dec. 22, 2020

(86) PCT No.: PCT/JP2020/047830
§ 371 (c)(1),
(2) Date: Sep. 9, 2022

(87) PCT Pub. No.: WO2021/186831
PCT Pub. Date: Sep. 23, 2021

(65) Prior Publication Data
US 2023/0163862 A1  May 25, 2023

(30) Foreign Application Priority Data
Mar. 16, 2020  (JP) .................................. 2020-044891

(51) Int. Cl.
H04B 10/80 (2013.01)
(52) U.S. Cl.
CPC ........... H04B 10/80 (2013.01); H04B 10/807 (2013.01)
(58) Field of Classification Search
None
See application file for complete search history.

(56) References Cited

U.S. PATENT DOCUMENTS

| 9,755,745 B2* | 9/2017 | Beck | H04B 10/807 |
| 10,561,060 B2* | 2/2020 | Yuasa | G01J 3/0208 |
| 11,178,472 B2* | 11/2021 | Iannone | H04B 10/0793 |
| 11,294,192 B2* | 4/2022 | Goodno | H01S 3/1001 |
| 2003/0169502 A1* | 9/2003 | Ogura | G02B 5/201 |
| | | | 372/109 |
| 2015/0098697 A1* | 4/2015 | Marom | G02B 6/2848 |
| | | | 398/44 |

FOREIGN PATENT DOCUMENTS

JP  2010135989 A  6/2010

* cited by examiner

*Primary Examiner* — Jai M Lee
(74) *Attorney, Agent, or Firm* — HAUPTMAN HAM, LLP

(57) ABSTRACT

Power sourcing equipment of a power-over-fiber system includes a first laser, a second laser, and a light input/output part. The first laser oscillates with electric power to output feed light. The second laser oscillates with electric power to output feed light. The light input/output part inputs first feed light output by the first laser and second feed light output by the second laser to a single channel of an optical fiber. A light intensity distribution of the first feed light at an output end face of the channel differs from a light intensity distribution of the second feed light at the output end face of the channel. The first feed light and the second feed light are simultaneously input to the channel to reduce non-uniformity of a light intensity distribution at the output end face. Further, incident angles α1 and α2 are different from each other to reduce the non-uniformity of the light intensity distribution at the output end face.

6 Claims, 8 Drawing Sheets

POWER SOURCING EQUIPMENT OF POWER-OVER-FIBER SYSTEM AND POWER-OVER-FIBER SYSTEM

RELATED APPLICATIONS

The present application is a National Phase of International Application No. PCT/JP2020/047830 filed Dec. 22, 2020, which claims priority to Japanese Application No. 2020-044891, filed Mar. 16, 2020.

TECHNICAL FIELD

The present disclosure relates to optical power supply.

BACKGROUND ART

Recently, an optical power supply system has been studied that converts electric power into light (called feed light), transmits the feed light, converts the feed light into electric energy, and uses the electric energy as electric power.

PTL 1 discloses an optical communication device including an optical transmitter, an optical fiber, and an optical receiver. The optical transmitter transmits signal light modulated based on an electric signal and feed light for supplying electric power. The optical fiber includes a core, a first cladding surrounding the core, and a second cladding surrounding the first cladding. The core transmits the signal light. The first cladding has a refractive index lower than that of the core and transmits the feed light. The second cladding has a refractive index lower than that of the first cladding. The optical receiver operates with electric power obtained by converting the feed light transmitted through the first cladding of the optical fiber and converts the signal light transmitted through the core of the optical fiber into the electric signal.

CITATION LIST

Patent Literature

PTL 1: Japanese Unexamined Patent Application Publication No. 2010-135989

SUMMARY OF INVENTION

Technical Problem

When an optical fiber (250A) is used as a power supply medium and light (112) output by a laser (111) is used as an electric power supply source (see FIGS. 11 and 12), the arrival time of the light varies because of the modal dispersion (see FIG. 12).

Thus, a light intensity distribution varies at an output end (202A) of the optical fiber. Consequently, a photoelectric conversion efficiency decreases at a photoelectric conversion element (311).

Solution to Problem

In one aspect of the present disclosure, power sourcing equipment of a power-over-fiber system includes a first laser, a second laser, a light input/output part. The first laser oscillates with electric power to output feed light. The second laser oscillates with electric power to output feed light. The light input/output part inputs first feed light output by the first laser and second feed light output by the second laser to a single channel of an optical fiber. A light intensity distribution of the first feed light at an output end face of the channel differs from a light intensity distribution of the second feed light at the output end face of the channel. The first feed light and the second feed light are simultaneously input to the channel to reduce non-uniformity of a light intensity distribution at the output end face.

Advantageous Effects of Invention

In the one aspect of the present disclosure, the power sourcing equipment of the power-over-fiber system reduces the non-uniformity of the light intensity distribution at the feed light output end face of the optical fiber and increases the photoelectric conversion efficiency at the photoelectric conversion element.

DESCRIPTION OF EMBODIMENTS

Some embodiments of the present disclosure are described below with reference to the drawings.

(1) Overview of System

First Embodiment

Figure 1:
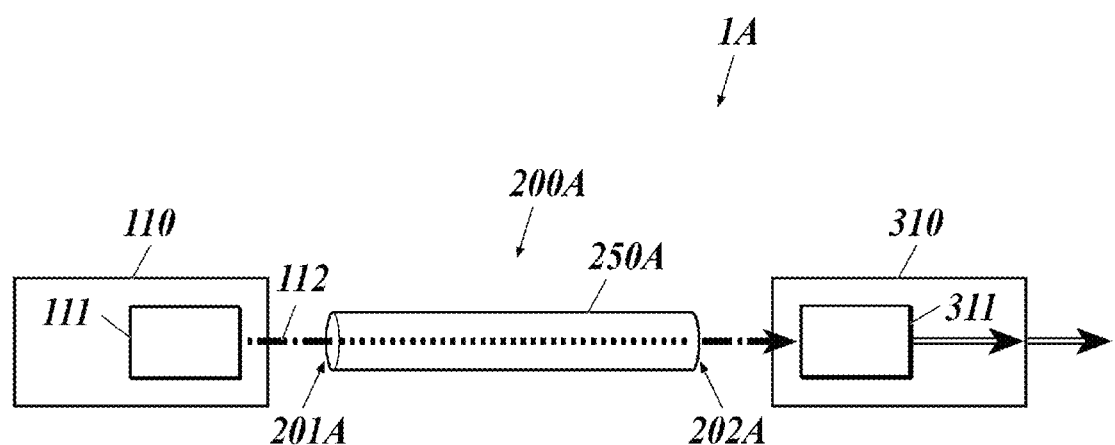
FIG. 1 is a diagram illustrating a configuration of a power-over-fiber system according to a first embodiment of the present disclosure.

As illustrated in FIG. 1, a power-over-fiber (PoF) system 1A according to the present embodiment includes power sourcing equipment (PSE) 110, an optical fiber cable 200A, and a powered device (PD) 310.

In the present disclosure, the power sourcing equipment 110 is equipment that converts electric power into optical energy and supplies the optical energy, and the powered device 310 is a device that receives the supplied optical energy and converts the optical energy into electric power.

The power sourcing equipment 110 includes a semiconductor laser 111 for power supply.

The optical fiber cable 200A includes an optical fiber 250A that forms a channel of feed light.

The powered device 310 includes a photoelectric conversion element 311.

The power sourcing equipment 110 is connected to a power source, which electrically drives the semiconductor laser 111 for power supply and so on.

The semiconductor laser 111 for power supply oscillates with electric power supplied from the power source to output feed light 112.

The optical fiber cable 200A has one end 201A connectable to the power sourcing equipment 110 and an other end 202A connectable to the powered device 310, and transmits the feed light 112.

The feed light 112 from the power sourcing equipment 110 is input to the one end 201A of the optical fiber cable 200A. The feed light 112 propagates through the optical fiber 250A and is output from the other end 202A to the powered device 310.

The photoelectric conversion element 311 converts the feed light 112 transmitted through the optical fiber cable 200A into electric power. The electric power obtained by the photoelectric conversion element 311 through the conversion is used as driving electric power needed in the powered device 310. The powered device 310 is capable of outputting, for an external device, the electric power obtained by the photoelectric conversion element 311 through the conversion.

Semiconductor materials of semiconductor regions that exhibit a light-electricity conversion effect of the semiconductor laser 111 for power supply and the photoelectric conversion element 311 are semiconductors having a short laser wavelength of 500 nm or shorter.

Semiconductors having a short laser wavelength have a large band gap and a high photoelectric conversion efficiency. Thus, the photoelectric conversion efficiency on the power-supplying side and the powered side of optical power supply increases, and consequently the optical power supply efficiency increases.

Therefore, the semiconductor materials to be used may be, for example, semiconductor materials that are laser media having a laser wavelength (fundamental wave) of 200 to 500 nm such as diamond, gallium oxide, aluminum nitride, and gallium nitride.

The semiconductor materials to be used may be semiconductors having a band gap of 2.4 eV or greater.

For example, semiconductor materials that are laser media having a band gap of 2.4 to 6.2 eV such as diamond, gallium oxide, aluminum nitride, and gallium nitride may be used.

Laser light having a longer wavelength tends to have a higher transmission efficiency. Laser light having a shorter wavelength tends to have a higher photoelectric conversion efficiency. Thus, in the case of long-distance transmission, a semiconductor material that is a laser medium having a laser wavelength (fundamental wave) longer than 500 nm may be used. When the photoelectric conversion efficiency is prioritized, a semiconductor material that is a laser medium having a laser wavelength (fundamental wave) shorter than 200 nm may be used.

These semiconductor materials may be used in either the semiconductor laser 111 for power supply or the photoelectric conversion element 311. The photoelectric conversion efficiency increases on the power-sourcing side or the powered side, and consequently the optical power supply efficiency increases.

Second Embodiment

Figure 2:
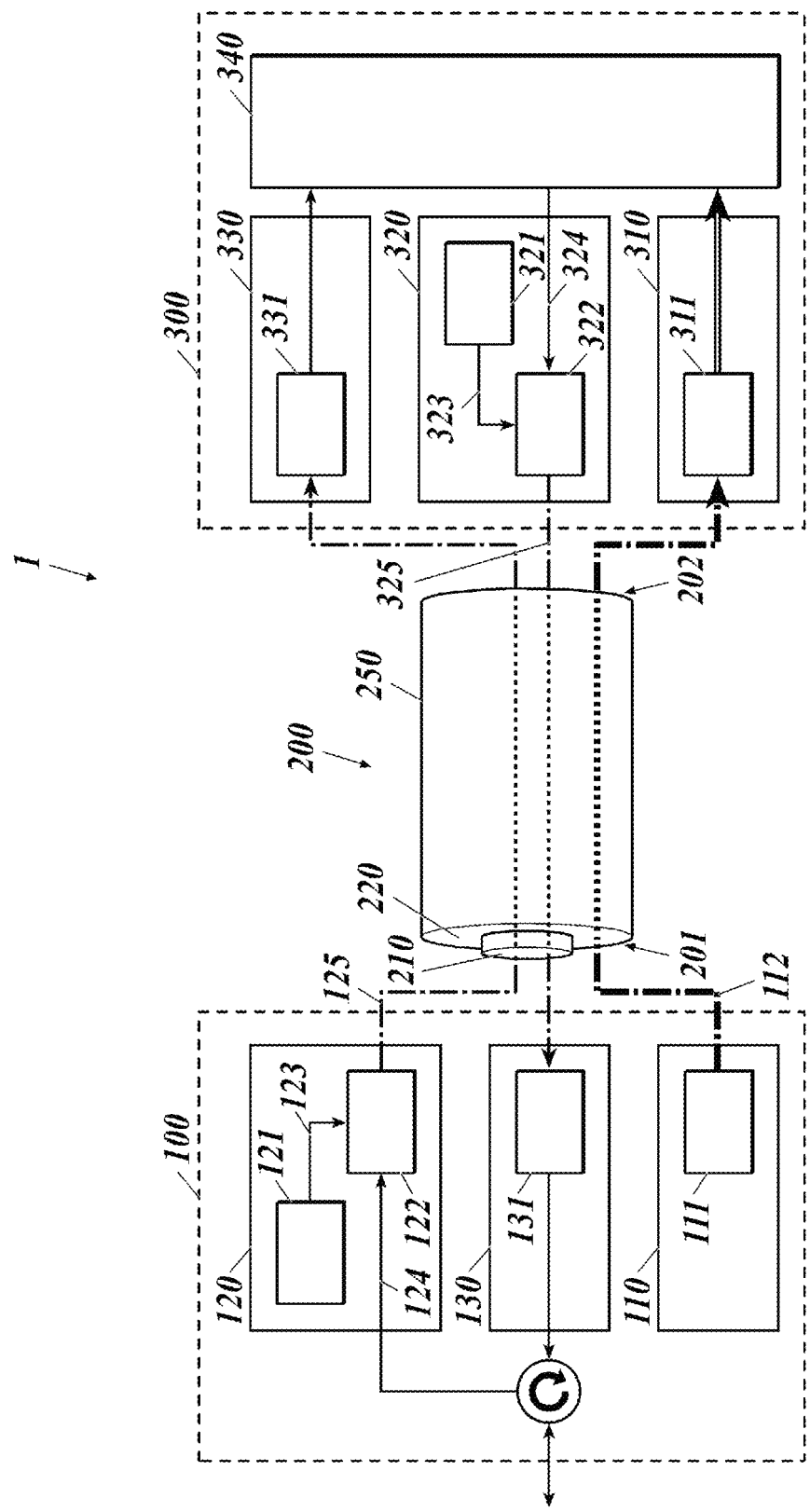
FIG. 2 is a diagram illustrating a configuration of a power-over-fiber system according to a second embodiment of the present disclosure.

As illustrated in FIG. 2, a power-over-fiber (PoF) system 1 according to the present embodiment is a system including a power supply system and an optical communication system with an optical fiber. Specifically, the power-over-fiber system 1 includes a first data communication device 100 including power sourcing equipment (PSE) 110, an optical fiber cable 200, and a second data communication device 300 including a powered device (PD) 310.

The power sourcing equipment 110 includes a semiconductor laser 111 for power supply. The first data communication device 100 includes, in addition to the power sourcing equipment 110, a transmitter 120 and a receiver 130 that perform data communication. The first data communication device 100 corresponds to data terminal equipment (DTE), a repeater, or the like. The transmitter 120 includes a semiconductor laser 121 for signals and a modulator 122. The receiver 130 includes a photodiode 131 for signals.

The optical fiber cable 200 includes an optical fiber 250 including a core 210 and a cladding 220. The core 210 forms a channel of signal light. The cladding 220 is arranged to surround the core 210 and forms a channel of feed light.

The powered device 310 includes a photoelectric conversion element 311. The second data communication device 300 includes, in addition to the powered device 310, a transmitter 320, a receiver 330, and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 is a unit that processes a received signal. The second data communication device 300 is a node in a communication network. Alternatively, the second data communication device 300 may be a node that communicates with another node.

The first data communication device 100 is connected to a power source, which electrically drives the semiconductor laser 111 for power supply, the semiconductor laser 121 for signals, the modulator 122, the photodiode 131 for signals, and so on. The first data communication device 100 is a node in the communication network. Alternatively, the first data communication device 100 may be a node that communicates with another node.

The semiconductor laser 111 for power supply oscillates with electric power supplied from the power source to output feed light 112.

The photoelectric conversion element 311 converts the feed light 112 transmitted through the optical fiber cable 200 into electric power. The electric power obtained by the photoelectric conversion element 311 through the conversion is used as driving electric power for the transmitter 320, the receiver 330, and the data processing unit 340 and as other driving electric power needed in the second data communication device 300. The second data communication device 300 may be capable of outputting, for an external device, the electric power obtained by the photoelectric conversion element 311 through the conversion.

On the other hand, the modulator 122 of the transmitter 120 modulates laser light 123 output from the semiconductor laser 121 for signals into signal light 125 on the basis of transmission data 124, and outputs the signal light 125.

The photodiode 331 for signals of the receiver 330 demodulates the signal light 125 transmitted through the optical fiber cable 200 into an electric signal, and outputs the electric signal to the data processing unit 340. The data processing unit 340 transmits data based on the electric signal to a node. The data processing unit 340 also receives data from the node, and outputs, as transmission data 324, the data to the modulator 322.

The modulator 322 of the transmitter 320 modulates laser light 323 output from the semiconductor laser 321 for signals into signal light 325 on the basis of the transmission data 324, and outputs the signal light 325.

The photodiode 131 for signals of the receiver 130 demodulates the signal light 325 transmitted through the optical fiber cable 200 into an electric signal, and outputs the electric signal. Data based on the electric signal is transmitted to a node. On the other hand, data from the node is treated as the transmission data 124.

The feed light 112 and the signal light 125 output from the first data communication device 100 are input to one end 201 of the optical fiber cable 200. The feed light 112 and the signal light 125 propagate through the cladding 220 and the core 210, respectively, and are output from an other end 202 of the optical fiber cable 200 to the second data communication device 300.

The signal light 325 output from the second data communication device 300 is input to the other end 202 of the optical fiber cable 200, propagates through the core 210, and is output from the one end 201 of the optical fiber cable 200 to the first data communication device 100.

Figure 3:
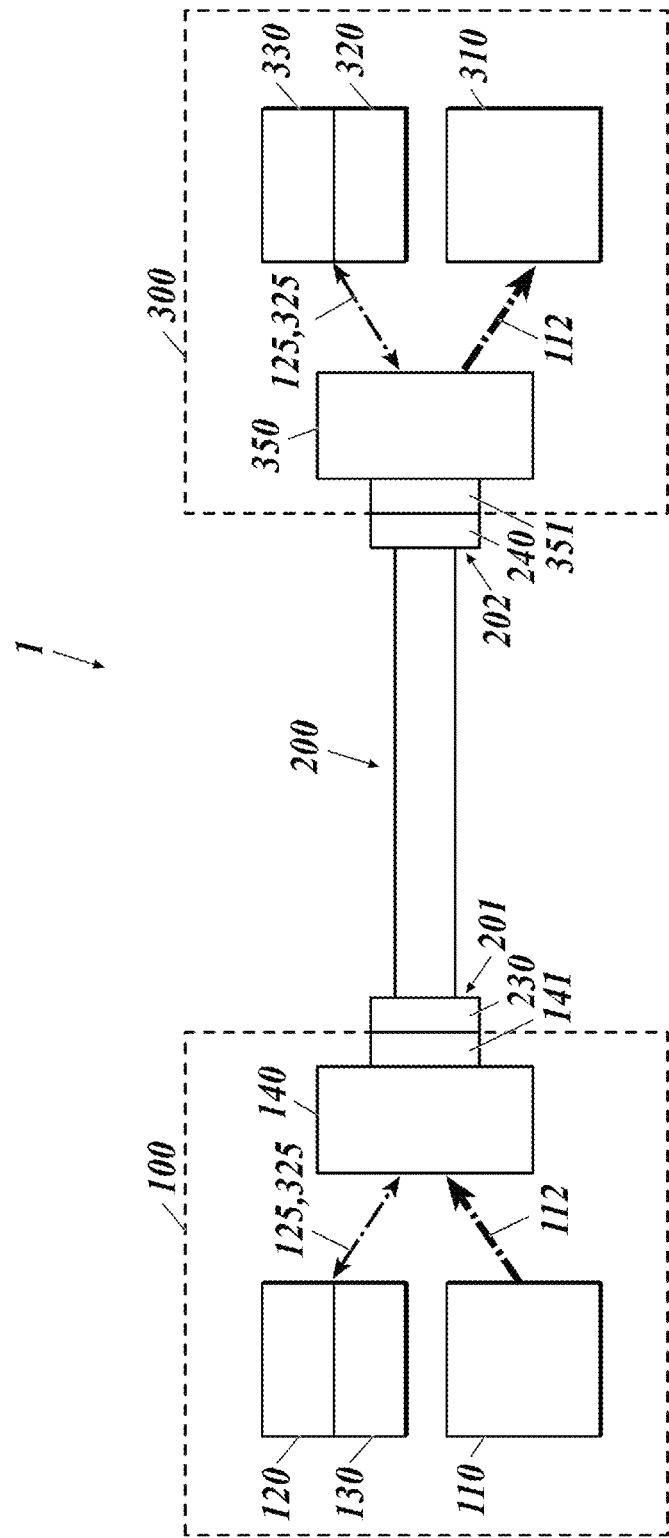
FIG. 3 is a diagram illustrating the configuration of the power-over-fiber system according to the second embodiment of the present disclosure, and illustrates optical connectors, etc.

As illustrated in FIG. 3, the first data communication device 100 includes a light input/output part 140 and an optical connector 141 attached to the light input/output part 140. The second data communication device 300 includes a light input/output part 350 and an optical connector 351 attached to the light input/output part 350. An optical connector 230 at the one end 201 of the optical fiber cable 200 is connected to the optical connector 141. An optical connector 240 at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300, and transmits the feed light 112. In the present embodiment, the optical fiber cable 200 transmits the signal light 125 and the signal light 325 bidirectionally.

As semiconductor materials of semiconductor regions that exhibit a light-electricity conversion effect of the semiconductor laser 111 for power supply and the photoelectric conversion element 311, same and/or similar materials as those mentioned in the first embodiment may be used, so that a high optical power supply efficiency is implemented.

Figure 4:
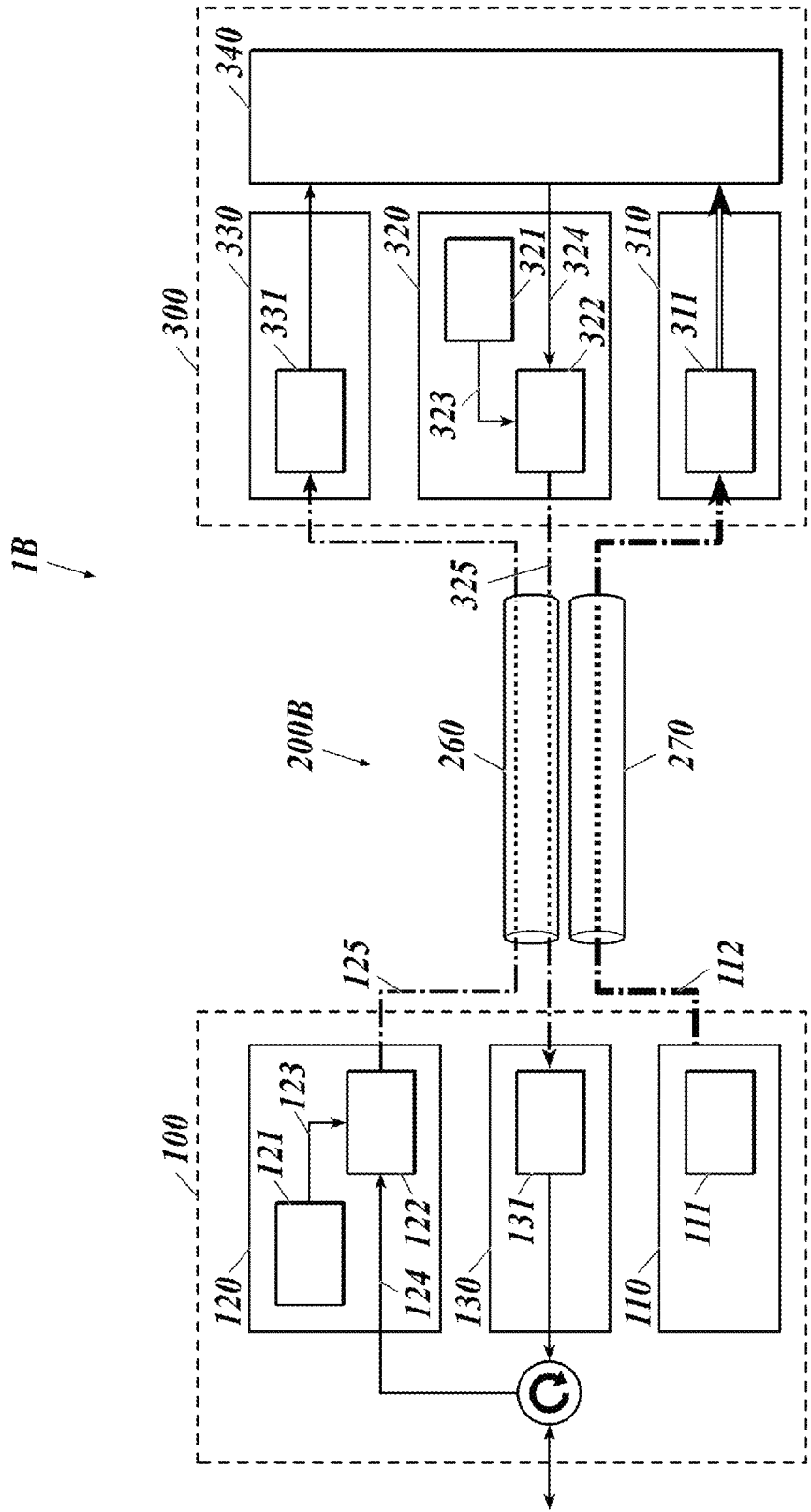
FIG. 4 is a diagram illustrating a configuration of a power-over-fiber system according to another embodiment of the present disclosure.

As in an optical fiber cable 200B of a power-over-fiber system 1B illustrated in FIG. 4, an optical fiber 260 that transmits signal light and an optical fiber 270 that transmits feed light may be provided separately. The optical fiber cable 200B may include a plurality of optical fiber cables.

(2) Reduction of Non-Uniformity of Light Intensity Distribution

Figure 5:
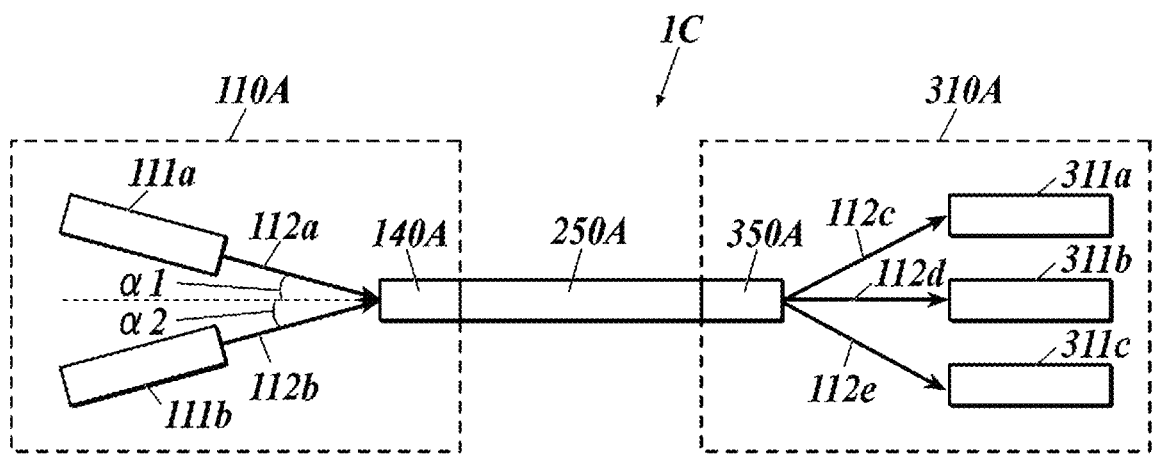
FIG. 5 is a diagram illustrating a configuration of a power-over-fiber system in which two lasers serve as feed light sources.
Figure 6:
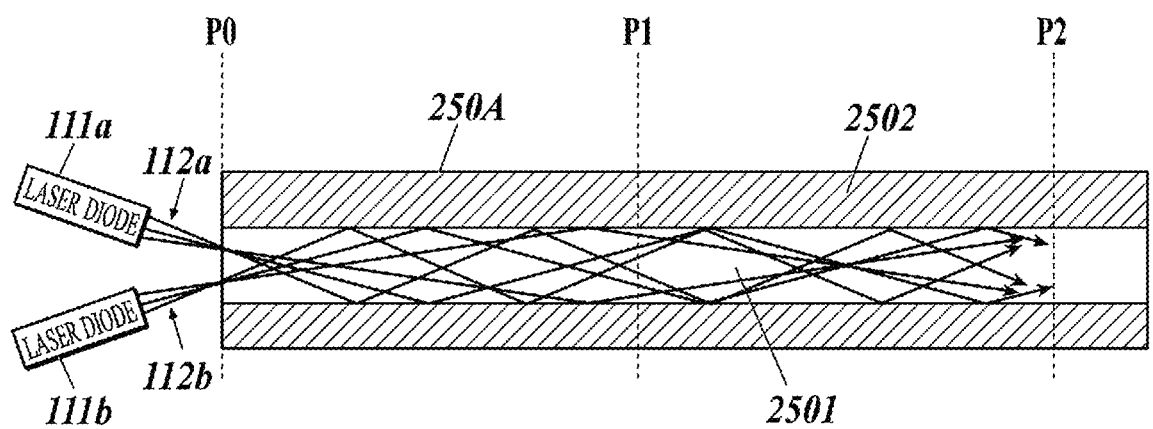
FIG. 6 is a diagram illustrating an optical path of feed light in the case of FIG. 5.

In contrast to the power-over-fiber system 1A described above, a power-over-fiber system 1C is implemented in which a first semiconductor laser 111a and a second semiconductor laser 111b simultaneously input feed light to a single channel 2501 as illustrated in FIGS. 5 and 6. The channel 2501 is a core and is surrounded by a cladding 2502. The configuration above may be implemented in the optical power supply system in the power-over-fiber system 1 or 1B. The implementation can be made in the same and/or similar manner when the channel is the cladding 220 as in the case of FIG. 2.

Power sourcing equipment 110A illustrated in FIG. 5 includes the first semiconductor laser 111a and the second semiconductor laser 111b. The first semiconductor laser 111a serves as a first laser that oscillates with electric power to output feed light. The second semiconductor laser 111b serves as a second laser that oscillates with electric power to output feed light.

The power sourcing equipment 110 further includes an optical multiplexer 140A as a light input/output part.

The optical multiplexer 140A inputs first feed light 112a output by the first semiconductor laser 111a and second feed light 112b output by the second semiconductor laser 111b to the same channel 2501 of the optical fiber 250A.

Let $\alpha 1$ denote an incident angle of the first feed light 112a to an input end face PO of the channel 2501, and let $\alpha 2$ denote an incident angle of the second feed light 112b to the input end face PO of the channel 2501. The power-over-fiber system 1C illustrated in FIGS. 5 and 6 corresponds to the case of $\alpha 1 = \alpha 2$.

For example, in the powered device 310A, feed light 112c, feed light 112d, and feed light 112e are respectively distributed to three photoelectric conversion elements 311a, 311b, and 311c through an optical demultiplexer 350A.

Figure 7:
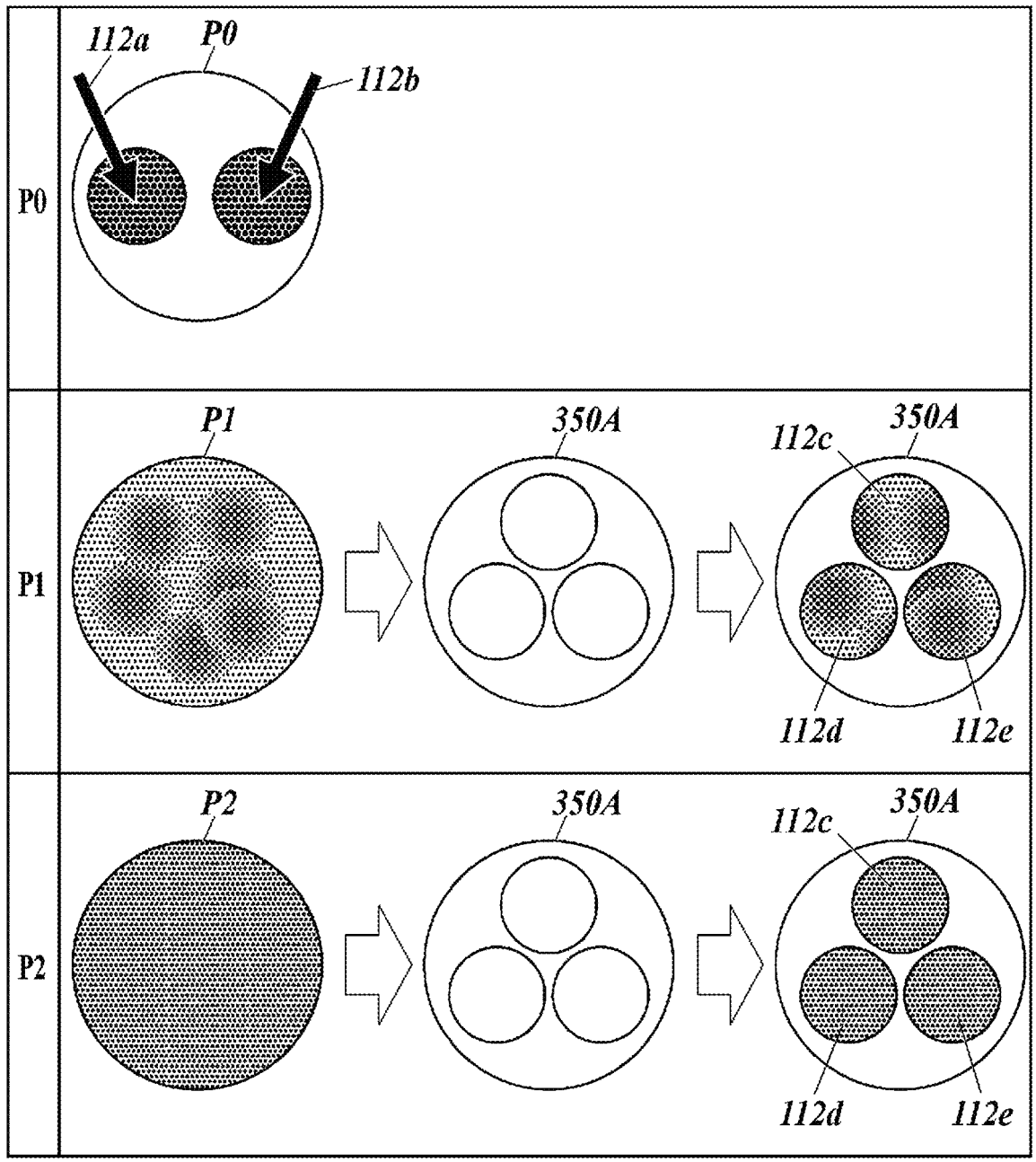
FIG. 7 is a cross-section illustrating cross-sections of a channel of FIG. 6.

As illustrated in an upper portion of FIG. 7, each of the first feed light 112a and the second feed light 112b locally concentrates at the input end face P0. Thus, the non-uniformity of the light intensity distribution is high.

The non-uniformity reduces because of the modal dispersion as the first feed light 112a and the second feed light 112b travel through the channel 2501. Since more light propagation modes are present than in the case of the first feed light 112a alone or in the case of the second feed light 112b alone, the modal dispersion becomes intense.

As illustrated in a middle portion of FIG. 7, the non-uniformity of the light intensity distribution reduces to some extent at a cross-section P1 at a short distance. If the cross-section P1 were an output end face of the channel 2501, the light intensity distribution of each of the feed light 112c, the feed light 112d, and the feed light 112e respectively input to the photoelectric conversion elements 311a, 311b, and 311c also varies. Thus, the photoelectric conversion efficiency reduces at each of the photoelectric conversion elements 311a, 311b, and 311c. The energies of the feed light 112c, the feed light 112d, and the feed light 112e are different from one another. Thus, electric powers output by the respective photoelectric conversion elements 311a, 311b, and 311c through conversion are different from one another. Thus, the efficiency reduces as a whole.

As illustrated in a lower portion of FIG. 7, the non-uniformity of the light intensity distribution further reduces at a cross-section P2 at a long distance. If the cross-section P2 were the output end face of the channel 2501, the uniformity of the light intensity distribution of each of the feed light 112c, the feed light 112d, and the feed light 112e respectively input to the photoelectric conversion elements 311a, 311b, and 311c increases. Thus, the photoelectric conversion efficiency increases at each of the photoelectric conversion elements 311a, 311b, and 311c. The differences among the energies of the feed light 112c, the feed light 112d, and the feed light 112e also reduce. Thus, the differences among the electric powers output by the respective photoelectric conversion elements 311a, 311b, and 311c through conversion also reduce. Thus, the efficiency increases as a whole.

A light intensity distribution obtained at the cross-section P1 at the short distance when the first feed light 112a alone is input and a light intensity distribution obtained at the cross-section P1 at the short distance when the second feed light 112b alone is input are considered.

The former light intensity distribution differs from the latter light intensity distribution. The former and latter light intensity distributions have a relationship in which a low intensity region of one of the light intensity distributions is compensated by a high intensity region of the other light intensity distribution. The former and latter light intensity distributions may be distributions that are approximate to each other rotationally symmetrically.

Thus, when the first feed light 112a and the second feed light 112b are simultaneously input to the channel 2501, the non-uniformity of the light intensity distribution at the cross-section P1 at the short distance is reduced, that is, the uniformity increases as compared with the case where the first feed light 112a alone is input and the case where the second feed light 112b alone is input.

A light intensity distribution obtained at the cross-section P2 at the long distance when the first feed light 112a alone is input and a light intensity distribution obtained at the cross-section P2 at the long distance when the second feed light 112b alone is input are considered.

The former light intensity distribution differs from the latter light intensity distribution. The former and latter light intensity distributions have a relationship in which a low intensity region of one of the light intensity distributions is compensated by a high intensity region of the other light intensity distribution. The former and latter light intensity distributions may be distributions that are approximate to each other rotationally symmetrically.

Thus, when the first feed light 112a and the second feed light 112b are simultaneously input to the channel 2501, the non-uniformity of the light intensity distribution at the cross-section P2 at the long distance is reduced, that is, the uniformity increases as compared with the case where the first feed light 112a alone is input and the case where the second feed light 112b alone is input.

Thus, in the power-over-fiber system 1C illustrated in FIGS. 5 and 6, the non-uniformity of the light intensity distribution at the output end face reduces irrespectively of the transmission distance as a result of simultaneous input of the first feed light 112a and the second feed light 112b to the channel 2501.

In the power-over-fiber system 1C, the non-uniformity of the light intensity distribution reduces at the output end face of the optical fiber 250A, and consequently the photoelectric conversion efficiency increases at the photoelectric conversion elements 311a, 311b, and 311c.

Figure 8:
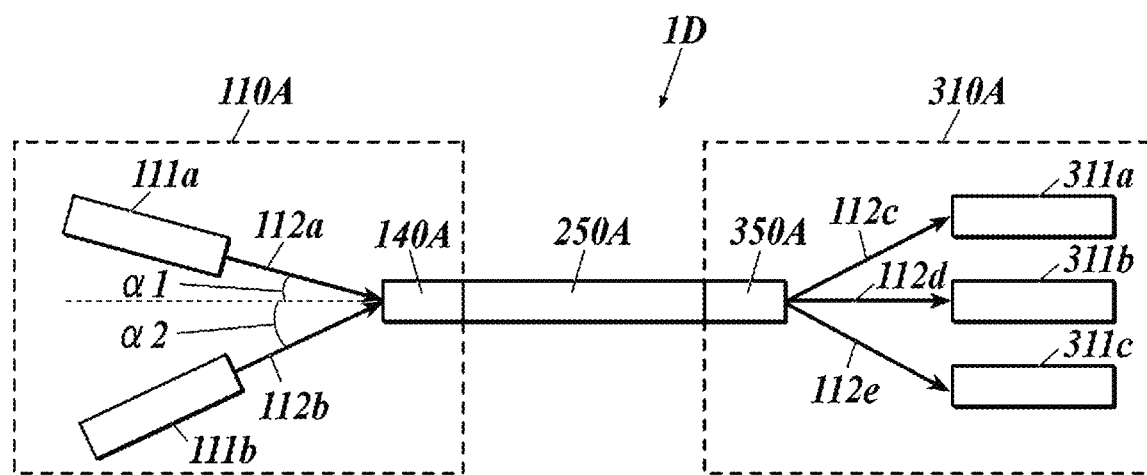
FIG. 8 is a diagram illustrating a configuration of a power-over-fiber system in which two lasers serve as feed light sources.
Figure 9:
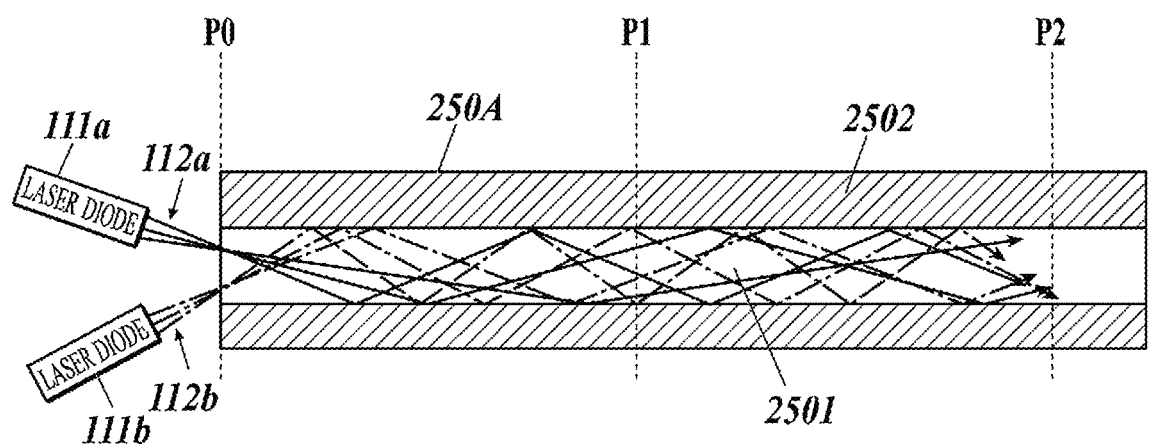
FIG. 9 is a diagram illustrating an optical path of feed light in the case of FIG. 8.

A power-over-fiber system 1D illustrated in FIGS. 8 and 9 corresponds to the case of $\alpha 1 \neq \alpha 2$, except for which, the power-over-fiber system 1D has a configuration that is same as and/or similar to the configuration of the system 1C. In FIGS. 8 and 9, $\alpha 1 < \alpha 2$ holds.

Figure 10:
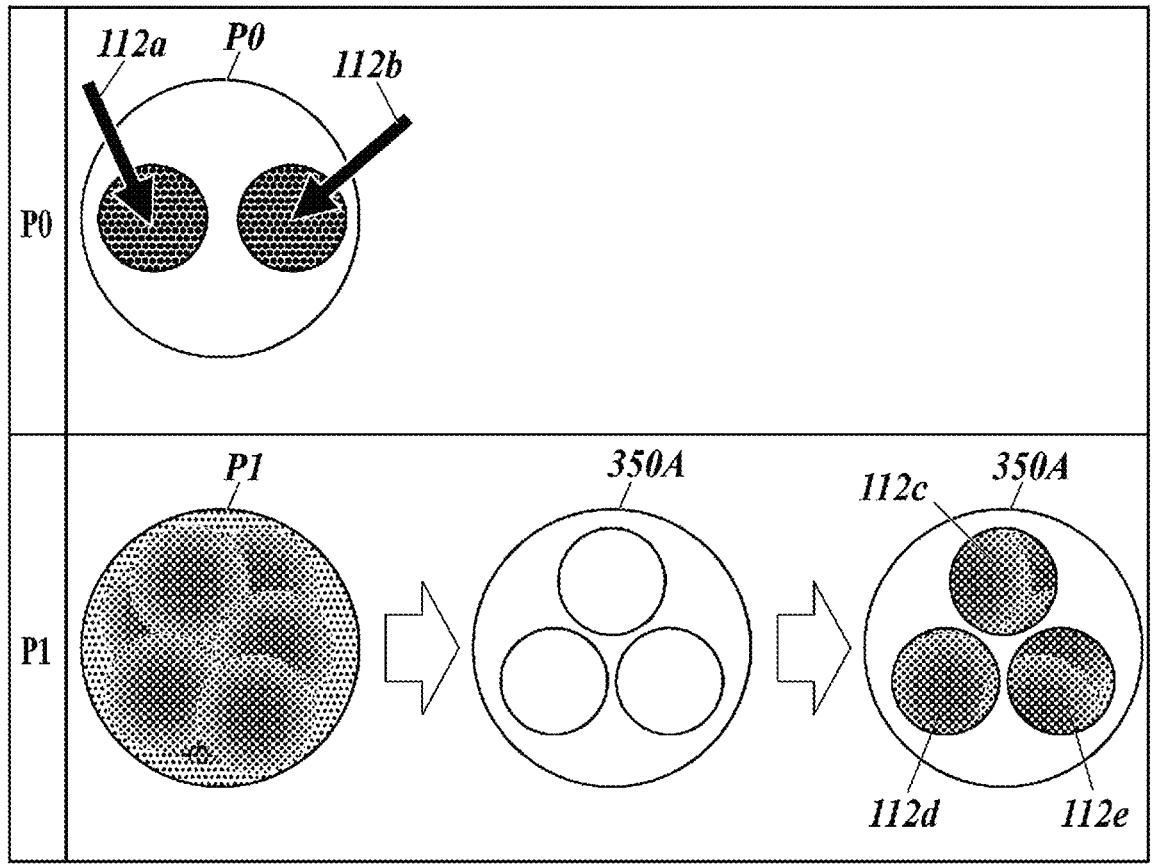
FIG. 10 is a cross-section illustrating cross-sections of a channel of FIG. 9.
Figure 11:
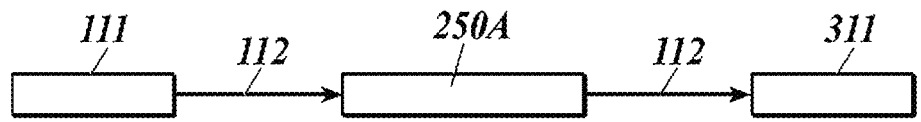
FIG. 11 is a diagram illustrating a configuration of a power-over-fiber system in which one laser serves as a feed light source.
Figure 12:
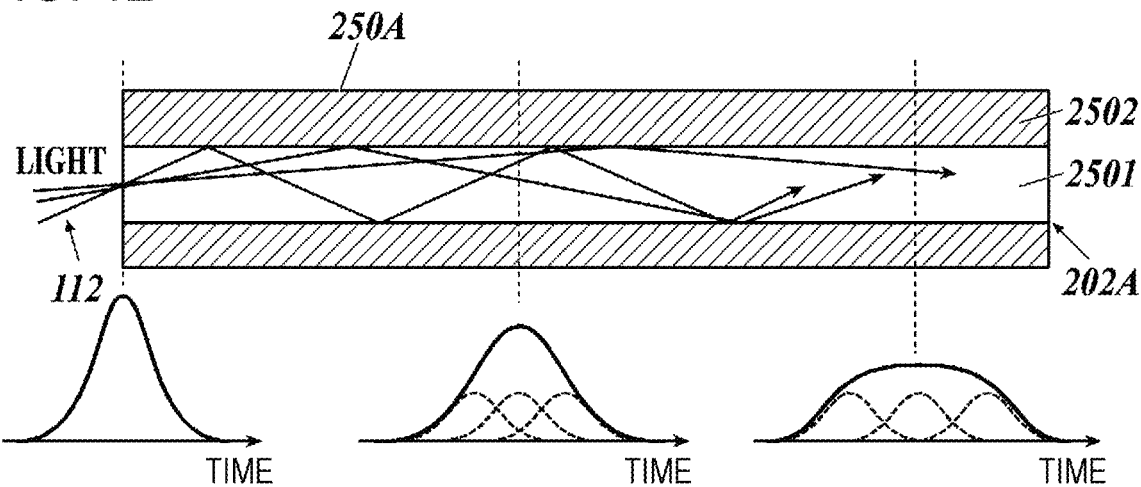
FIG. 12 is a diagram illustrating an optical path of feed light in the case of FIG. 11 and variances of arrival time at respective cross-sections.

In this case, as illustrated in an upper portion of FIG. 10, each of the first feed light 112a and the second feed light 112b also locally concentrates at the input end face P0. Thus, the non-uniformity of the light intensity distribution is high.

The non-uniformity reduces because of the modal dispersion as the first feed light 112a and the second feed light 112b travel through the channel 2501. Since more light propagation modes are present than in the case of the first feed light 112a alone or in the case of the second feed light 112b alone, the modal dispersion becomes intense. Because $\alpha 1 \neq \alpha 2$ is set, the modal dispersion becomes more intense.

As illustrated in a lower portion of FIG. 10, the non-uniformity of the light intensity distribution reduces also at the cross-section P1 at the short distance. Since the modal dispersion becomes more intense because $\alpha 1 \neq \alpha 2$ is set, the uniformity of the light intensity distribution is higher than the uniformity of the light intensity distribution at the cross-section P1 in the case of $\alpha 1 = \alpha 2$ in FIG. 7. Thus, the uniformity of the light intensity distribution of the feed line 112c, the feed light 112d, and the feed light 112e respectively input to the photoelectric conversion elements 311a, 311b, and 311c also increases, and the photoelectric conversion efficiency increases at each of the photoelectric conversion elements 311a, 311b, and 311c. The differences among the energies of the feed light 112c, the feed light 112d, and the feed light 112e reduce, and values of the electric powers output by the respective photoelectric conversion elements 311a, 311b, and 311c through conversion become closer to one another. Thus, the efficiency increases as a whole.

Thus, the photoelectric conversion efficiency at the photoelectric conversion elements of the power-over-fiber system 1D in which $\alpha 1 \neq \alpha 2$ is set further increases as compared with that of the power-over-fiber system 1C in which $\alpha 1 = \alpha 2$ is set.

Let $\beta 1(t)$ denote a phase of the first feed light 112a at the input end face P0, and let $\beta 2(t)$ denote a phase of the second feed light 112b at the input end face P0.

In the power-over-fiber system 1D illustrated in FIGS. 8 and 9, $\alpha 1 \neq \alpha 2$ is set. The same and/or similar advantageous effect can be obtained by setting $\beta 1(t) \neq \beta 2(t)$ instead of setting $\alpha 1 \neq \alpha 2$.

When $\beta 1(t) \neq \beta 2(t)$ is set, the first feed light 112a and the second feed light 112b are from laser light sources of the same kind and have the same wavelength, and conversion wavelengths of the photoelectric conversion elements 311 (311a, 311b, and 311c) correspond to this wavelength. Such a configuration can be efficient since the laser light sources of one kind and the photoelectric conversion elements of one kind are used. The conversion efficiency does not vary at the photoelectric conversion elements 311a, 311b, and 311c because the received feed light has the same wavelength but different phases.

By setting $\alpha 1 \neq \alpha 2$ and setting $\beta 1(t) \neq \beta 2(t)$, the equivalent or better advantageous effect can be obtained.

In the case of signal communication using light, to suppress an influence of a fluctuation of the arrival time caused by the modal dispersion, a GI mode optical fiber is used. However, in the case of optical power supply transmission, transmission using a non-GI-mode fiber is also possible since the optical power supply transmission is not intended for signal extraction. In any case, the incident angles $\alpha 1$ and $\alpha 2$ are set to allow total reflection at a critical angle or less.

While the embodiments of the present disclosure have been described above, these embodiments are merely presented as examples and can be carried out in various other forms. Each component may be omitted, replaced, or modified within a range not departing from the gist of the invention.

The powered device 310A may include only a single photoelectric conversion element. Even if the powered device 310A includes a single photoelectric conversion element, the uniformity of the light intensity distribution increases at a light-receiving surface of the photoelectric conversion element. Thus, the same and/or similar advantageous effect can be obtained.

In the power sourcing equipment 110A, the feed light may be input to the same channel from three or more lasers. In such a case, the three or more lasers may include at least one laser with a different incident angle. Further, all the incident angles may be set to be different from one another.

INDUSTRIAL APPLICABILITY

The present invention can be used for optical power supply.

The invention claimed is:

1. Power sourcing equipment of a power-over-fiber system, comprising:
a first laser configured to oscillate with electric power to output a first feed light;
a second laser configured to oscillate with electric power to output a second feed light; and
a light input/output part configured to input the first feed light from by the first laser and the second feed light from the second laser to a single channel of an optical fiber,
wherein a light intensity distribution of the first feed light at an output end face of the channel differs from a light intensity distribution of the second feed light at the output end face of the channel, and
wherein the light input/output part inputs the first feed light and the second feed light simultaneously to the channel to reduce non-uniformity of a light intensity distribution at the output end face.

2. The power sourcing equipment of the power-over-fiber system according to claim 1, wherein an incident angle of the first feed light to an input end face of the channel and an incident angle of the second feed light to the input end face of the channel are different from each other to reduce the non-uniformity of the light intensity distribution at the output end face.

3. The power sourcing equipment of the power-over-fiber system according to claim 1, wherein a phase of the first feed light at an input end face of the channel and a phase of the second feed light at the input end face of the channel are different from each other to reduce the non-uniformity of the light intensity distribution at the output end face.

4. The power sourcing equipment of the power-over-fiber system according to any one of claim 1,
wherein each of the first laser and the second laser is a semiconductor laser, and
wherein a semiconductor material of a semiconductor region that exhibits a light-electricity conversion effect of the semiconductor laser is a laser medium having a laser wavelength of 500 nm or shorter.

5. A power-over-fiber system comprising:
the power sourcing equipment according to claim 1;
a powered device including a photoelectric conversion element configured to convert the first feed light and the second feed light into electric power; and
an optical fiber cable having one end connectable to the power sourcing equipment and an other end connectable to the powered device and configured to transmit the first feed light and the second feed light.

6. The power-over-fiber system according to claim 5, wherein a semiconductor material of a semiconductor region that exhibits a light-electricity conversion effect of the photoelectric conversion element is a laser medium having a laser wavelength of 500 nm or shorter.

* * * * *